(12) United States Patent
Butler

(10) Patent No.: US 12,293,130 B2
(45) Date of Patent: May 6, 2025

(54) SOUND PROPAGATION IN VIRTUAL REALITY

(71) Applicant: T-MOBILE INNOVATIONS LLC, Overland Park, KS (US)

(72) Inventor: Robert Keith Butler, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 224 days.

(21) Appl. No.: 18/075,063

(22) Filed: Dec. 5, 2022

(65) Prior Publication Data

US 2024/0184511 A1 Jun. 6, 2024

(51) Int. Cl.
*G06F 3/16* (2006.01)
*H04R 5/033* (2006.01)

(52) U.S. Cl.
CPC ............. *G06F 3/165* (2013.01); *H04R 5/033* (2013.01)

(58) Field of Classification Search
CPC ................................. G06F 3/165; H04R 5/033
See application file for complete search history.

(56) References Cited

U.S. PATENT DOCUMENTS

2009/0290850 A1* 11/2009 Hickman ............... G06F 21/109
725/114
2023/0413003 A1* 12/2023 Smith ..................... H04S 7/303

* cited by examiner

*Primary Examiner* — Fan S Tsang
*Assistant Examiner* — David Siegel
(74) *Attorney, Agent, or Firm* — Shook Hardy & Bacon LLC

(57) ABSTRACT

The technology described herein controls what a user hears while in a virtual reality environment. A user may be exposed to multiple audio sources while in the virtual reality environment. All of these competing audio sources need to be combined to produce the audio content output to the user. Further, various entities have an interest in the user hearing different audio content. The interest can be expressed through settings made available by the VR platform. The VR platform can provide user settings, landowner settings, and platform settings. The sound settings can change based on where the user's avatar is located in the VR environment. For example, when the user's avatar is located on virtual property owned by an entity other than the VR platform or user, then entities sound-preferences are considered along with the user's sound preferences, and VR platform's sound preferences.

20 Claims, 7 Drawing Sheets

SOUND PROPAGATION IN VIRTUAL REALITY

CROSS-REFERENCE TO RELATED APPLICATIONS

None.

BACKGROUND

Virtual reality technology employs specialized computing hardware and software to provide users with perceptually-real and fully-immersive virtual environments to interact with and explore. Virtual reality technologies can place users into virtual, computer-generated environments, where they can perceive and interact with virtual objects rendered therein. While virtual environments and the virtual objects within them may appear present in a user's perceived virtual environment, they are typically not present in the user's immediate physical world. The same can generally be said about the converse, more specifically, that objects present in the user's immediate physical environment are typically not present in the user's perceived virtual environment.

The virtual environment can also include sounds emanating from various sources in the virtual environment. Immersion in a digital world depends on sound and vision. The visual depiction of virtual objects may form a virtual landscape, while the sounds may be described as a soundscape. For example, spatial audio places audio in three dimensions, so when a user turns their head, sounds change direction and volume just as they do in real life. In real life, sound may be received from many sources. For example, in a mall, each store may play background music that could be heard while walking by stores. In real life, all shoppers would hear the same music. It may be desirable to create a similar experience in the virtual world, but to customize it to a user's musical taste.

SUMMARY

The technology described herein controls what a user hears while in a virtual reality environment. A user may be exposed to multiple audio sources while in the virtual reality environment. These audio sources may be external of the virtual reality environment, though still received by the user through a head mounted display (HMD) through which the virtual reality environment is presented, or internal to the virtual reality environment. Examples of external sources can include media steaming, music players, phone notifications, and the like. The internal sources originate within the virtual reality environment and can include sounds produced by other avatars in the virtual reality environment, ambient noises, platform notifications, and audio content from virtual landowners.

All of these competing audio sources are combined to produce the audio content output to the user. Further, various entities have an interest in the user hearing different audio content. The entities can include the end-user, the virtual reality platform (hereafter "VR platform"), virtual landowners, and users of other avatars. The interests can be expressed through settings made available by the VR platform. The VR platform can provide user settings, landowner settings, and platform settings. These settings can be followed to determine the final output provided to the user.

The technology described herein evaluates an audio content communicated to a user through the VR environment, determines whether or not the audio content should be output to the user's HMD, and, if it is to be output, assigns a sound-level relative to sound-levels assigned to other audio content. The yes/no determination and sound-level determination are made by evaluating sound settings. The sound settings can change based on where the user's avatar is located in the VR environment. For example, when the user's avatar is located on virtual property owned by an entity other than the VR platform or user, then entities sound-preferences are considered along with the user's sound preferences, and VR platform's sound preferences. In contrast, when the user's avatar is located on virtual property owned by the VR platform, then only the user's and VR platform's sound-preferences are considered.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
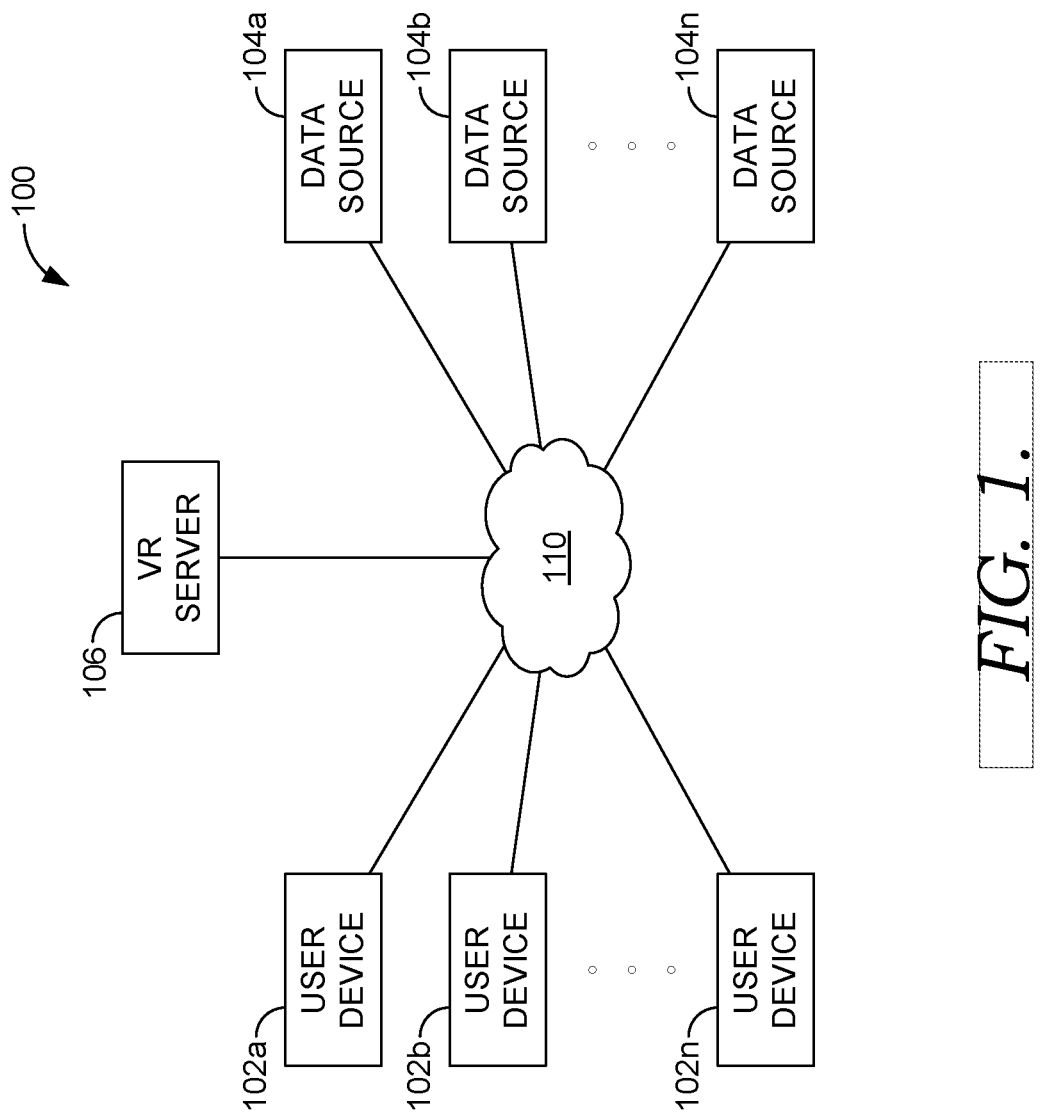
FIG. 1 is a block diagram of an example operating environment for a virtual service and telecommunications network, in accordance with some embodiments of the present disclosure.

The technology described herein controls what a user hears while in a virtual reality environment. A user may be exposed to multiple audio sources while in the virtual reality environment. These audio sources may be external of the virtual reality environment, though still received by the user through a head mounted display (HMD) through which the virtual reality environment is presented, or internal to the virtual reality environment. Examples of external sources can include media steaming, music players, phone notifications, and the like. The internal sources originate within the virtual reality environment and can include sounds produced by other avatars in the virtual reality environment, ambient noises, platform notifications, and audio content from virtual landowners.

All of these competing audio sources need to be combined to produce the audio content output to the user. Further, various entities have an interest in the user hearing different audio content. The entities can include the end-user, the virtual reality platform (hereafter "VR platform"), virtual landowners, and users of other avatars. The interest can be expressed through settings made available by the VR platform. The VR platform can provide user settings, landowner settings, and platform settings.

The technology described herein evaluates an audio content communicated to a user through the VR environment, determines whether or not the audio content should be output to the user's HMD, and, if it is to be output, assigns a sound-level relative to sound-levels assigned to other audio content. The yes/no determination and sound-level determination are made by evaluating sound settings. The sound settings can change based on where the user's avatar is located in the VR environment. For example, when the user's avatar is located on virtual property owned by an entity other than the VR platform or user, then entities sound-preferences are considered along with the user's sound preferences, and VR platform's sound preferences. In contrast, when the user's avatar is located on virtual property owned by the VR platform, then only the user's and VR platform's sound-preferences are considered.

Immersive technology refers to perceptual and interactive technologies that, in essence, blur the line between the physical world and the simulated world to generate a virtual reality. Perceptual technologies can trick a user's brain into believing that digital information being perceived in virtual space is real. Interactive technologies, on the other hand, can recognize user outputs (e.g., speech, gestures, movements, etc.) detected in physical space, and can respond to it in virtual space, accordingly. Together, perceptual and interactive technologies can provide users with an illusion that an immersive virtual environment or "virtual world" is just as real as the physical environment or "physical world" in which they are present.

As used herein, Virtual reality (VR) is a fully-immersive technology, where a user of the technology can only perceive a rendered virtual environment and virtual objects therein, as if the perceived visual information was their present reality. While immersed in the virtual world, typically when wearing a head-mounted display (e.g., VR headset), the user is visually disconnected from the real world. In other words, while a user can still physically roam about in the real world, the user can only perceive the displayed virtual world and the virtual objects therein.

As will be utilized throughout the present disclosure, the terms "real-world" or "physical" can be used interchangeably, both corresponding to tangible or non-virtual environments or objects. Moreover, the term "on-the-fly" or "real-time" are interchangeably referenced to correspond to a responsive behavior, such as the performance of an operation in response to the receipt of data or a signal (e.g., from a sensor). While such responsive behaviors may be limited in speed or response times in some situations, it is contemplated that the responsive behavior is performed in a manner that is preferably substantially instantaneous (e.g., less than 1 second). Further, as will be utilized throughout the present disclosure, the terms "render" and "generate" are interchangeably referenced to correspond to the digital creation of a virtual object or environment, such as one that can be provided for display to a HMD. As one of ordinary skill in the art may appreciate, a movement (e.g., traversal, walking, roaming) within a physical environment can correspond to perceived movement within a virtual environment. That is, as a user changes his/her location (e.g., takes a step) in their physical environment, a corresponding change in location can be perceived in the perceived virtual environment. In this regard, in some aspects, dimensions (e.g., width, length, height, relative distance) of a physical object in a physical environment can correspond to a virtual object in a virtual environment.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
AOCN Administrative Operator Carrier Number
CA Carrier Aggregation
CD-ROM Compact Disk Read Only Memory
CDMA Code Division Multiple Access
CLLI Common Language Location Identifier
CSI Channel State Information
DVD Digital Versatile Discs
EEPROM Electrically Erasable Programmable Read Only Memory
eNB Evolved Node B
FD-MIMO Full-Dimension Multiple-Input Multiple-Output
FDD Frequency Division Duplex
gNB Next Generation Node B
GPRS General Packet Radio Service
GSM Global System for Mobile communications
HSS Home Subscriber Server
I-CSCF Interrogating Call Session Control Function
IBCF Interconnection Border Control Function
IoT Internet of Things
LTE Long Term Evolution
MAC Media Access Control
MID Management Instrumentation and Discovery
MIMO Multiple-Input Multiple-Output
MME Mobile Management Entity
MU-MIMO Multi-User Multiple-Input Multiple-Output
NR New Radio
OCN Operator Carrier Number
OFDM Orthogonal Frequency-Division Multiplexing
OTDOA Observed Time Difference of Arrival
P-CSCF Proxy Call Session Control Function
PC Personal Computer
PDA Personal Digital Assistant
PLMN Public Land Mobile Network
QoS Quality of Service
RAM Random Access Memory
RF Radio-Frequency
ROM Read Only Memory
RSRP Reference Signal Received Power
RSRQ Reference Signal Received Quality
RSSI Received Signal Strength Indicator
S-CSCF Serving Call Session Control Function
SIM Subscriber Identity Module
SINR Signal-to-Interference and Noise Ratio
SIP Session Initiation Protocol
SPID Service Provider ID
TAS Telephony Application Server
TDD Time Division Duplex
TDMA Time Division Multiple Access UICC Universal Integrated Circuit Card
VLAN Virtual Local-Area-Network
VoIP Voice Over Internet Protocol
VoLTE Voice over LTE
VoNR Voice over NR In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Further, the term "some" may refer to "one or more." Additionally, an element in the singular may refer to "one or more." The term "combination" (e.g., a combination thereof, combinations thereof) may refer to, for example, "at least one of A, B, or C"; "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.). Other combinations may include more or less than three options associated with the A, B, and C examples.

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) may be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; VR server 106; and network 110. Each of the components shown in FIG. 1 may be implemented via any type of computing device, such as computing device 700 described in connection to FIG. 7, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

User devices 102a and 102b through 102n may be client devices on the client-side of operating environment 100, while VR server 106 may be on the server-side of operating environment 100. The data sources 104a and 104b through 104n may be on either side of the operating environment 100. The user devices may be HMDs and facilitate access to a virtual environment. In some examples, multiple user devices facilitate access to a virtual environment. For example, a laptop or game console may access the VR server 106 and use a communicatively coupled HMD as a display. The devices may belong to many different users and a single user may use multiple devices. In aspects, multiple users simultaneously access the virtual environment provided by VR server 106 through their own user devices. The user devices can include audio output ports for headphones and/or include speakers for direct output. The user devices 102a and 102b through 102n may output sound received from the VR server 106 and one or more data sources 104a and 104b through 104n.

VR server 106 may comprise server-side software designed to work in conjunction with client-side software on user devices 102a and 102b through 102n to implement any combination of the features and functionalities discussed in the present disclosure. For example, the VR server 106 may provide the VR environment 220. This division of operating environment 100 is provided to illustrate one example of a suitable environment, and there is no requirement for each implementation that any combination of server 106 and user devices 102a and 102b through 102n remain as separate entities.

In virtual reality (VR) systems, users may be immersed in and interact with a digitally simulated virtual environment provided by a VR server 106. The VR server 106 can maintain the state of the virtual world and output video and audio signals to the user devices 102a and 102b through 102n connected to the VR server 106. Similarly, the user devices 102a and 102b through 102n can communicate audio signals and control signals to the VR server 106. In aspects, the virtual world can simultaneously host multiple users. The virtual world can be generated as part of a multi-player video game environment, social network, and other service or application.

User devices 102a and 102b through 102n may comprise any type of computing device capable of use by a user. For example, in one aspect, user devices 102a through 102n may be the type of computing device described in relation to FIG. 7 herein. Additionally, a "computing device," as used herein, is a device that has the capability of using a wireless communications network, and may also be referred to as a "user device," "mobile device," "user equipment," "wireless communication device," or "UE." A computing device, in some aspects, may take on a variety of forms, such as a PC, HMD (e.g., a virtual reality headset, augmented reality glasses) a laptop computer, a desktop computer, a tablet, a mobile phone, a PDA, a server, or any other device that is capable of communicating with other devices (e.g., by transmitting or receiving a signal) using a wireless communication.

In aspects, a computing device (i.e., user device) discussed herein may be configured to communicate using one or more of 4G (e.g., LTE), 5G, 6G, another generation communication system, or a combination thereof. In some aspects, the computing device has a radio that connects with a 4G cell site but is not capable of connecting with a higher generation communication system. In some aspects, the computing device has components to establish a 5G connection with a 5G gNB, and to be served according to 5G over that connection. In some aspects, the computing device may be an E-UTRAN New Radio—Dual Connectivity (ENDC) device. ENDC allows a user device to connect to an LTE eNB that acts as a master node and a 5G gNodeB that acts as a secondary node. As such, in these aspects, the ENDC device may access both LTE and 5G simultaneously, and in some cases, on the same spectrum band.

Data sources 104a and 104b through 104n may comprise data sources and/or data systems, which are configured to make data available to any of the various constituents of operating environment 100, or VR operating environment 200 described in connection to FIG. 2. For example, the data sources may comprise email servers, social media servers, or other sources of content that could produce an audible notification on a user device where received by the user device. The data sources 104*a* and 104*b* through 104*n* can include external sound sources, such as streaming services. The data sources 104*a* and 104*b* through 104*n* can also be external sources for digital rights information, such as audio rights manager 216. Data sources 104*a* and 104*b* through 104*n* may be discrete from user devices 102*a* and 102*b* through 102*n* and VR server 106 or may be incorporated and/or integrated into at least one of those components. For example, data sources 104*a* and 104*b* through 104*n* could facilitate internal sound sources within the virtual environment.

Figure 2:
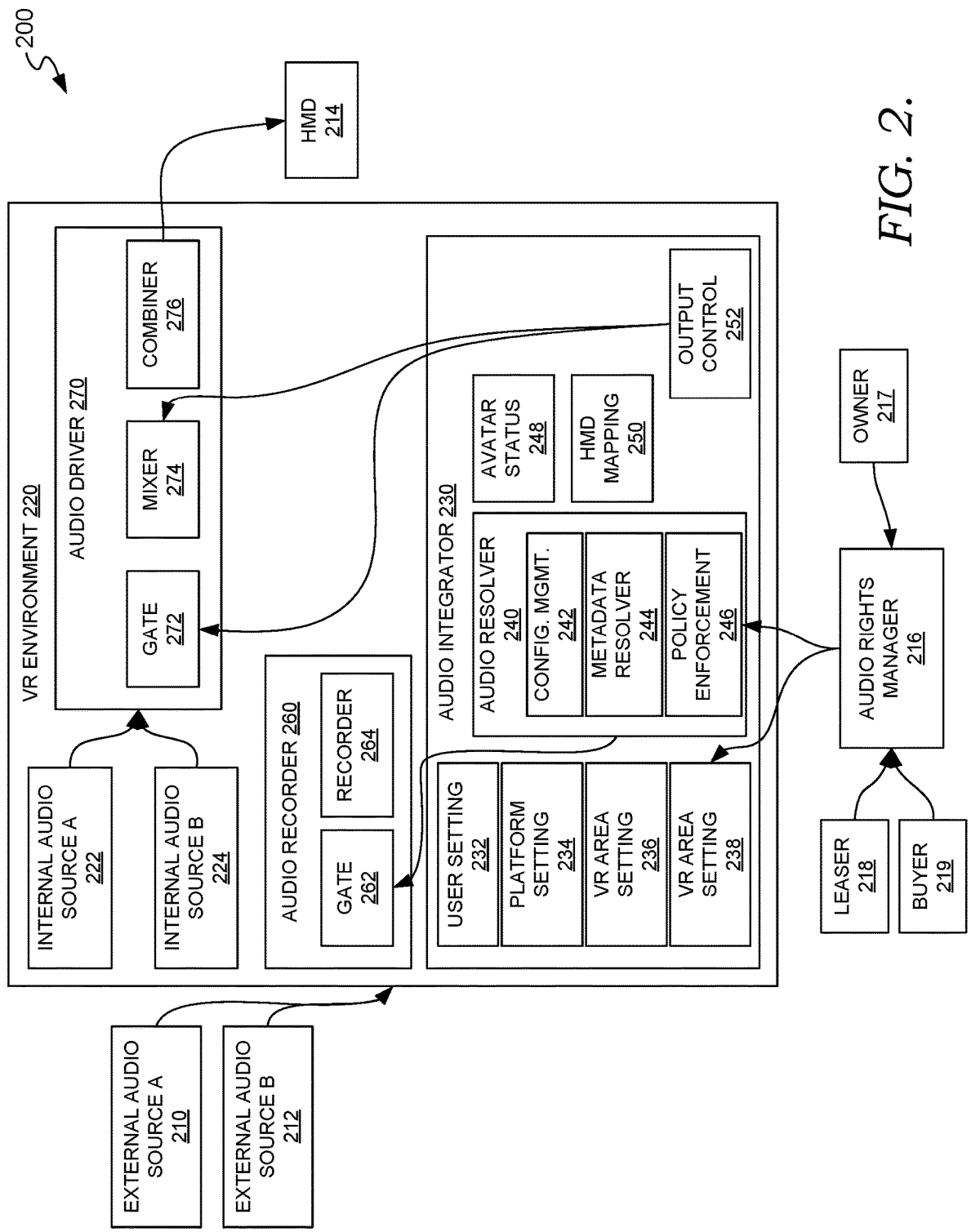
FIG. 2 is a block diagram of an example virtual world, in accordance with some embodiments of the present disclosure.

Operating environment 100 may be utilized to implement one or more of the components of VR operating environment 200, described in FIG. 2, including components for managing rights to various sounds and blending the sounds to form an output provided to the user.

Referring now to FIG. 2, with FIG. 1, a block diagram is provided showing aspects of an example computing system architecture suitable for implementing some aspects of the present disclosure and designated generally as VR operating environment 200. VR operating environment 200 represents only one example of a suitable computing system architecture. Other arrangements and elements may be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example VR operating environment 200 includes external audio source A 210, external audio source B 212, HMD 214, audio rights manager 216, audio rights owner 217, audio rights leaser 218, audio rights buyer 219 and VR environment 220 (and its components 222, 224, 230, 232, 234, 236, 238, 240, 242, 244, 246, 248, 250, 252, 260, 262, 264, 270, 272, 274, and 276). These components may be embodied as a set of compiled computer instructions or functions, program modules, computer software services, or an arrangement of processes carried out on one or more computer systems, such as computing device 700 described in connection to FIG. 7, for example.

In one aspect, the functions performed by components of VR operating environment 200 are associated with one or more applications, services, or routines. In particular, such applications, services, or routines may operate on one or more user devices (such as user device 102*a*), servers (such as VR server 106), may be distributed across one or more user devices and servers, or be implemented in the cloud. Moreover, in some aspects, these components of VR operating environment 200 may be distributed across a network, including one or more servers (such as VR server 106) and client devices (such as user device 102*a*), in the cloud, or may reside on a user device, such as user device 102*a*. Moreover, these components, functions performed by these components, or services carried out by these components may be implemented at appropriate abstraction layer(s), such as the operating system layer, application layer, hardware layer, etc., of the computing system(s). Alternatively, or in addition, the functionality of these components and/or the aspects described herein may be performed, at least in part, by one or more hardware logic components. For example, and without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with reference to specific components shown in example VR operating environment 200, it is contemplated that in some aspects functionality of these components may be shared or distributed across other components.

When in virtual reality, a user may receive audible content from various sources. The sources of audible content can be internal to the virtual world or external to the virtual world. FIG. 2 shows external audio source A 210 and external audio source B 212 as examples of external audio sources. External audio sources originate from outside of the virtual environment. In other words, the audio sources are not from an entity within the virtual reality. External audio sources can include streaming services, content players, and the like. A user may listen to music or a podcast from a streaming service while exploring the virtual world. This can be analogous to a person going for a walk through a park in the real world while listening to music. The sounds in the park (e.g., kids playing, dogs barking, and leaves rustling) are internal to the park, while the music is provided by a device/service associated with the user.

FIG. 2 shows internal audio source A 222 and internal audio source B 224 as examples of internal audio sources. Internal audio sources originate with an entity inside the virtual reality world. Examples of entities inside the virtual world include other virtual users, virtual vehicles, and virtual structures. Sounds emanating from virtual users can include speech. In one example, virtual users can come together to put on a virtual musical performance. Prerecorded music can also be output through virtual speakers in a virtual structure, such as a virtual home, virtual store, and the like.

The technology described herein provides a sound management system within the VR environment 220 that create a sound propagation experience that takes into account user settings 232, platform settings 234, virtual reality (VR) area settings 236, and audio rights 238 in view of the avatar status (e.g.,) among other factors. Thus, the technology described herein can control what the user hears in the virtual reality world by resolving a hierarchy of sound settings. In addition to controlling what the user hears, the audio recorder 260 can control what the user does with various audio content received from entities in the virtual world. Controlling what the user can do with various audio content may allow entities within the virtual world to share content with users that would otherwise not be shareable because of copyright or other digital rights management issues. For example, a store could play music to users within the store without concern that the virtual users could record the music being played. As a privacy enhancement, the recording of audio or video content from within the virtual world may be prevented based on various user settings, area settings, platform settings, or the like.

The audio integrator 230 manages various audio settings and resolves the setting to generate a set of sound characteristics that can be used by the audio driver 270 to balance different available sounds. The set of sound characteristics may also be used by the audio recorder 260 to determine whether an audio content may be recorded. The audio integrator 230 can assign a set of sound characteristics to a particular audio content. The characteristics may be used by the audio driver 270 to combine a particular audio content with other audio content and form an audio output to the HMD 214. Though illustrated for a single user of HMD 214 herein for the sake of simplicity, in a production environment, a similar system is used for each user of the VR Environment 220.

Audio characteristics can include whether the audio content source is inside the virtual reality world or outside virtual reality world. The inside VR or outside VR origin characteristic of audio content may be used by various applications to make decisions. For example, audio content from outside the virtual reality world may bypass some digital rights management protections put in place to govern audio content originating inside the virtual reality world. The source of the audio content can be used to assign inside VR or outside VR origin characteristic. Metadata associated with the audio content may be used to identify its source.

A second audio characteristic is whether the audio content may be overdubbed. This characteristic may be assigned a yes or no value. A yes value allows lower priority sounds to be mixed in with the audio content. A no value causes all lower priority sounds to be preempted. Thus, the overdubbing characteristic may be used in combination with the priority characteristic described subsequently. Audio content that is not able to be overdubbed will preempt all other content. In contrast, audio content that is able to be overdubbed can be blended with other content. Whether a particular audio content may be overdubbed may be determined by the audio integrator 230 resolving various settings.

The various settings may be resolved hierarchically. In one aspect, the platform settings 234 are evaluated first. If the platform settings 234 indicate that the audio content is not able to be overdubbed, then a no overdubbing value may be assigned to the overdubbing characteristic. In this example, the platform settings 234 have the highest priority. Various platform notifications may be assigned a no overdubbing value.

If the platform settings 234 specify that the audio content may be overdubbed or are silent about the audio content, then the VR area settings 234 may be evaluated. The VR area settings 236 can be set by an entity that controls an area of the virtual reality world. For example, a virtual storeowner could provide VR area settings 236 for the virtual area within the virtual store. The VR area settings 236 for the virtual store would only be interrogated if the user's avatar were located within the area. The avatar status 248, which can include a location within the virtual world, may be used to determine what, if any, VR area settings 236 apply. If the VR area settings 236 indicate that the audio content is not able to be overdubbed while the user's avatar is in the area, then a no overdubbing value may be assigned to the overdubbing characteristic. In this example, the VR area settings 236 have the second highest priority behind the platform settings 234 but ahead of the user settings 232.

If the platform settings 234 and VR area settings 236 specify that the audio content may be overdubbed or are silent about the audio content, then the user settings 232 may be evaluated. If the user settings 232 indicate that the audio content is not able to be overdubbed, then a no overdubbing value may be assigned to the overdubbing characteristic. If the user settings 232 specify that the audio content may be overdubbed or are silent about the audio content, then a "yes" overdubbing value may be assigned to the overdubbing characteristic. When none of the settings specify a characteristic a default characteristic may be assigned. The default characteristic may be assigned by the platform. In the case of overdubbing, the default value may allow overdubbing to create a more realistic virtual soundscape.

A third audio characteristic is a priority setting. The priority setting determines a relative volume of an audio content compared other audio content. In one aspect, the priority settings fall into a range, such as 0 to 5, 0 to 7, 0 to 10, or some other scale. The mixer 274 may use the priority associated with the audio content to assign a sound level. The higher the priority the higher the sound level. In aspects, assigning the highest priority to an audio content may create a user experience similar to the user listening to the audio content through headphones all other sounds are coming from the real world. The priority setting may be assigned by evaluating the platform settings 234, VR area settings 236, and user settings 232. In one aspect, the highest priority assigned by any of the settings is used as the final characteristic. In another aspect, the lowest priority assigned by any of the settings is used as the final characteristic. In another aspect, the average priority assigned by any of the settings is used as the final characteristic. In another aspect, the highest hierarchical setting is used. For example, the platform settings 234 may be the highest in the hierarchy and effectively preempt the other settings.

A fourth audio characteristic is a mixable setting. The mixable setting can be used to determine whether the user can assign a specific volume to an audio content relative to other audio sources. This characteristic may be used in a detailed volume control application for the virtual reality experience. In an aspect, the highest hierarchical setting is used. For example, the platform settings 234 may be the highest in the hierarchy and effectively preempt the other settings.

A fifth characteristic is preemption. A yes value to the preemption characteristic means the audio content can be attenuated or muted by equal priority sounds. A no value means that the audio content cannot be attenuated or muted by equal priority sounds. In an aspect, the highest hierarchical setting is used. For example, the platform settings 234 may be the highest in the hierarchy and effectively preempt the other settings.

A sixth characteristic is duration. Some audio content has a finite duration while other audio content has an ongoing duration. An audio stream, conversation, and background noise are examples of audio content with an ongoing duration. In general, audio content with an unknown duration may be described as ongoing. A recorded song is an example of an audio content with a finite duration. Characteristics of the audio content may be evaluated to determine the duration characteristic of an audio content. The duration characteristics may be used to set a priority. An entity may raise or lower the priority of an audio stream based on the audio stream's duration.

A seventh characteristic is availability. The availability characteristic describes whether an audio content is consumable during only a certain period of time or is persistent in the virtual world. If the audio content is only available during a certain period of time, the availability characteristic may define its time range, such as for the next two hours. In aspects, audio with limited availability may receive a higher priority than persistent audio.

An eight characteristic is live. Content of virtual reality world may either be live or recorded. The life characteristic may be assigned a yes/no value. The no value means the audio content is recorded. The life characteristic may be used to assign various controls to an audio content. For example, a live content may be stopped, paused, or rewound (depending on other settings). More controls, including editing controls, may be available for a recorded content. The live characteristic may be assigned by evaluating the audio content and metadata associated with it.

The ninth characteristic is controllability. The controllability characteristic can specify whether audio content may be controlled. If the audio content may be controlled, the available controls may be specified in associated with the controllability characteristic. Example controls include play, stop, pause, fast-forward, rewind, skip, and the like.

The 10$^{th}$ characteristic is recordable. This characteristic may be assigned a yes/no value. In aspects, the audio rights database 238 is consulted to determine whether an audio content may be recorded by a user. The audio rights database 238 can manage rights to various content, especially copyrightable works, and determine whether they may be recorded. The content of the audio rights database 238 may be populated, at least in part, by operations of the audio rights manager 216.

The audio rights manager 216 allows rights owners 217 to specify a compensation required for use of works they own within the virtual world. Audio rights leasers 218 may lease audio content. Audio content leases may be for a duration of time, such as a year. Audio content leases may require payment per performance and the payment may vary based on the audience. The policy may specify particular uses, such as only within a VR area. This way, a virtual store or other setting could lease music to present to virtual users within the area controlled by the virtual store. A buyer 219 would have more rights than a leaser; however, purchasers of audio content can still be restrained to uses consistent with copyright laws and conditions of purchase. For example, a user could purchase a song to listen to within the virtual world. This virtual purchase would not allow the user to listen to the song through a music player when not connected to the virtual world. The user may not play the purchased song for other virtual users under some conditions.

In addition to, or as an alternative to consulting the audio rights database 238, various user settings 232, platform settings 234, and a virtual area settings 236 may be parsed to determine whether an audio content is recordable. For example, a user speaking with a virtual world generates live audio content. The user, as the originator of the audio content, may specify within user settings 232 that audio content they generate is not recordable by other users. Similarly, controllers of a VR area may specify that content generator output by the entity within the VR area is not recordable. Additionally, controllers of a VR area may specify that no content generator output within the VR area is recordable. The platform settings 234 may also be consulted to determine whether a specific content is recordable.

An 11th characteristic is whether a recorded content is modifiable. The modifiable characteristic can be associated with a yes/no value. As with the recordable characteristic, the modifiable characteristic may be determined by evaluating the user settings 232, the platform settings 234, the VR area settings 236, and the audio rights database 238.

The audio resolver 240 includes a configuration management component 242, a metadata resolver 244, and the policy enforcement component 246. The configuration management component 242 can provide user interfaces through which the user settings 232, the platform settings 234, and the VR area settings 236 are managed. The configuration management component 242 may require a presentation of credentials such as a user name and password before granting access to various settings.

The metadata resolver 244 receives and analyzes metadata associated with various audio content. The metadata can identify a source of the content and other characteristics of the content. The metadata resolver 244 can normalize metadata values and attributes from different metadata schemas. Different audio content can include different metadata schemas. The normalized metadata can then be used to assign various characteristics to an audio content, such as whether the content is internal or external. The metadata resolver 244 can provide determined values to the output control component 252.

The policy enforcement component 246 can parse a hierarchy of settings and determine a final setting for an audio content. For example, the user settings 232, the platform settings 234, and the VR area settings 236 could be parsed to determine a priority assigned to a particular audio content. In an aspect, the setting with the highest priority is used as the final value for the priority characteristic. The policy enforcement component 246 can provide determined values to the output control component 252.

The avatar status 248 identifies characteristics of a user's avatar within the virtual world. The characteristics can include a location within the virtual world, present activities (e.g., playing a game, at a virtual concert, making a phone call), the identification of other users being interacted with, and the like. These characteristics can be used to determine which policies are enforced. For example, a user's location in the virtual world may determine whether VR area settings 236 need to be consulted. Some areas in the virtual world may not be governed by VR area settings 236.

The HMD mapping component 250 maps a particular HMD 214 to a user profile. The user profile can be used by the avatar status component 248 to associate a particular avatar with a particular HMD. The user profile can also be used to identify the correct user settings 232.

The various audio characteristics assigned to a particular audio content by the audio integrator 230 are consumed by the audio driver 270 to form the soundscape heard by the user of HMD 214. The audio driver 270 includes a gate function 272, a mixer 274, and combiner 276. The gate function 272 acts as a filter that assigns a yes/no judgment to a particular audio content. A no judgment means that the audio content is not passed to the user. A yes judgment allows the audio content to be output to the user based on an intensity assigned by the mixer 274. In some aspects, content receiving a yes judgment may not be presented to the user because of actions taken by the mixer 274. The gate function 272 can consider the digital rights of a recipient or broadcaster of an audio content when assigning a yes/no judgment. In aspects, gate function 272 will render a no judgment when the recipient does not have a right to receiving audio content and/or the broadcaster does not have a right to output the audio content.

In addition to digital rights, the gate function 272 may consider user settings, VR area settings, and platform settings when making a yes/no judgment. For example, a user setting may specify they are not to receive audio content associated with a content advisory. The content advisory could include a warning that audio content include sexually explicit content, drug and alcohol references, references to violence, and the like. Other content advisories may specify a recommended age for the content. Such content warnings may be used by the gate function 272 to render a yes/no judgment.

The mixer 274 assigns a sound level to an audio content based on the priority value of the audio content and the priority values of other audio content. In general, audio contents with a higher priority are assigned a higher sound intensity than audio contents having a lower priority value. Other characteristics, such as the overdub, mixable characteristic, and preemptable characteristic may be used by the mixer 274 when assigning sound levels. For example, if an audio content is mixable, then a user volume setting assigned to the audio content may be retrieved and evaluated when assigning the sound value. If the audio content is not mixable, then user volume settings do not need to be considered for the particular audio content.

As another example, if an audio content may be preempted, then comparison with other audio content may be conducted to determine if other audio content has an equal or higher priority value. The sound value assigned to an audio content that may be preempted may be lower than would otherwise be assigned if the audio content may not be preempted. In other words, audio content that may not be preempted may be assigned a sound value based solely on its priority value if it is the highest priority audio content.

The overdub characteristic may also be considered when assigning sound values. The overdub characteristic may be evaluated starting with the audio content having the highest priority. If the overdub characteristic for the audio content having the highest priority forbids overdubbing of lower priority audio content, then the lower priority audio content may be assigned a sound value of zero. If the overdub characteristic for the audio content having the highest priority allows overdubbing, the lower priority audio content may be assigned a sound value based on the priority value assigned to the lower value content.

The audio recorder 260 determines whether an audio content may be recorded by the user of HMD 214. The audio recorder 260 includes a gate 262 and a recorder function 264. The gate 262 makes a yes/no recording decision based on various factors. The various factors can include digital rights to the audio content. The digital rights may specify whether an audio content may be recorded. The recordable characteristic of an audio content may be used by the gate 262 to make a yes/no decision. If recording is allowed, the recorder function 264 may make a recording of a specific audio content. The recorded content may then be stored in the virtual environment and available within the virtual environment.

The combiner 276 generates a final sound output to the HMD 214 by combining the sound inputs according to the sound intensity assigned by the mixer 274.

Figure 3:
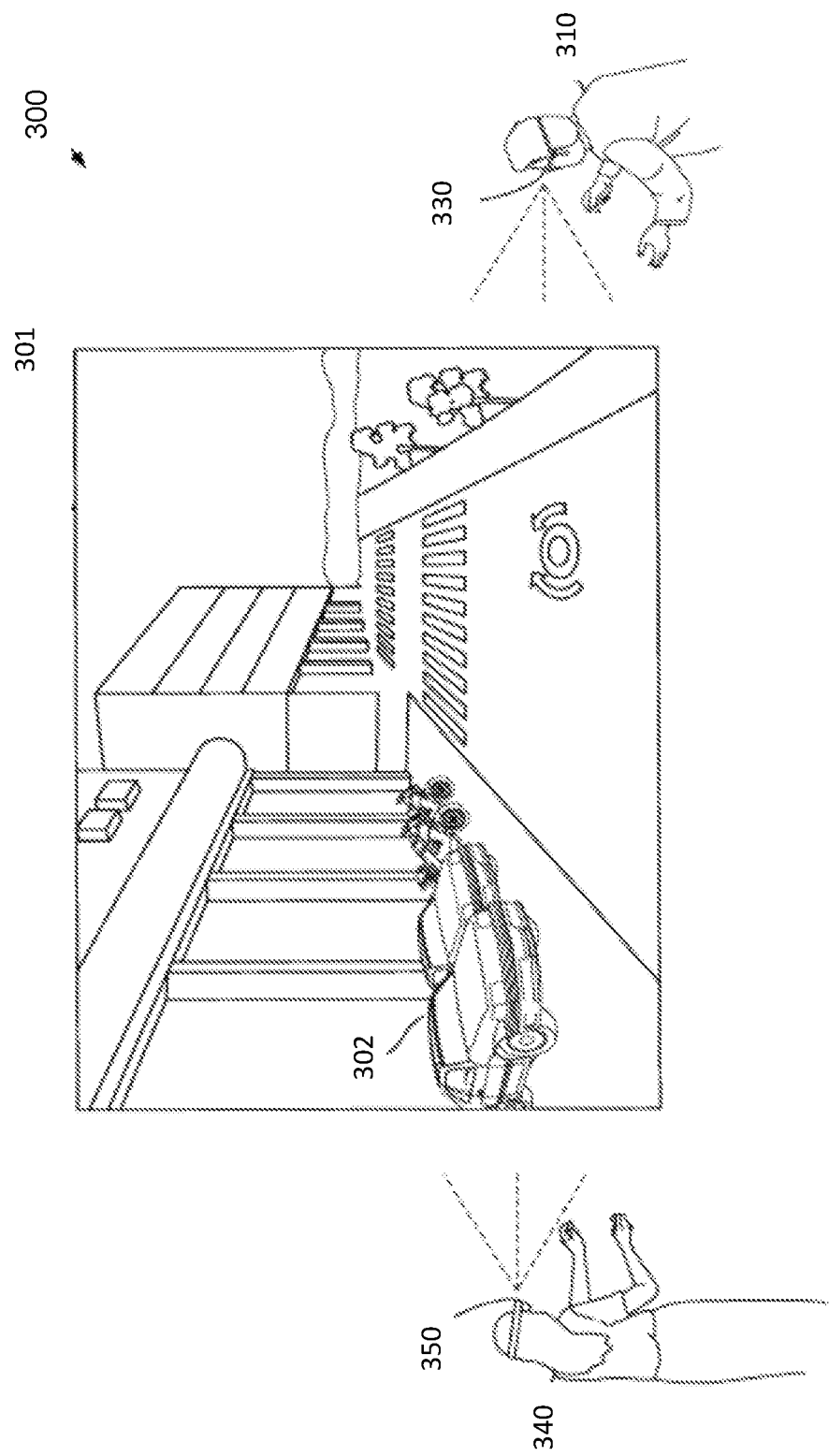
FIG. 3 depicts a variety of illustrations showing example phone interface in a virtual world, in accordance with some embodiments of the present disclosure.

For example, referring to FIG. 3, VR scenario 300 includes one or more computers or mobile devices, HMD headset 330 worn by user 310, and one or more sensors (not shown) for detecting VR input from user 310, e.g., in the form of movement, voice, gestures, etc. VR output may be presented to user 310, e.g., HMD 330 may present a three-dimensional (3D) stereoscopic view of a virtually simulated VR environment 301 to user 310, audio may be generated corresponding to VR environment 301 using audio output equipment (e.g., headphones or speakers) not shown in FIG. 3, or other output modalities may be included such as temperature, tactile response, etc.

User 310 may interact with VR environment 301 using any of a plurality of input modalities, e.g., spoken commands, hand gestures, virtual "touch" of icons displayed in the environment, other types of body orientation and/or movement signals, etc. The VR system may accordingly adjust the presentation of VR environment 301 to user 310 using the visual and/or other VR output modalities. Note the particular details of the VR system of FIG. 3 are described herein for illustrative purposes only, and are not meant to limit the scope of the present disclosure to any embodiments specifically mentioned, e.g., types of input or output modalities, types of VR environment or applications, etc.

In an embodiment, HMD 330 and other input/output sensors of the VR system may be in communication with a user equipment (not shown), which in turn is in communication with a network supporting the virtual reality world. In an alternative embodiment, HMD 330 may directly be in communication with such a network.

In FIG. 3, VR environment 301 is illustratively shown to be a VR simulation of a street-level environment (hereinafter denoted "VR street 302"), although it will be appreciated that any type of VR environment may be accommodated using techniques of the present disclosure. In VR street 302, user 310 may be immersed in a VR environment in which he or she experiences the sensation of standing and moving outdoors on a street lined with many venues and other objects. In VR street 302, user 310 may have the option of approaching and interacting with various venues and objects in the simulation. For example, by walking towards a virtual store, and performing a gesture such as touching the handle of the booth door using a specific hand gesture, the VR system may infer an intent by user 310 to enter the interior of the store. The store is an example of a VR area. Upon entering the store, the entity associated with the VR store may be able to present audio content to the user. The VR area preferences may be evaluated to determine characteristics of the audio content. These characteristics are then used to include the audio content from the store in the user's soundscape.

The VR street 302 is provided to illustrate a scenario where multiple nested VR area settings may influence audio content characteristics. The VR street 302 may be a virtual shopping district controlled by a first entity. This first entity may specify VR area characteristics for common areas, such as the street itself. The first entity may delegate authority to a second entity, such as a storeowner, to provide their own VR area settings that govern sounds received by the user while the user's avatar is within the second entity's area. The first entity may allow secondary entities to broadcast sounds into the common area, so long as the sounds satisfy the VR area settings for the common area. The intensity of the sounds may be influenced by the location of the avatar within the common area. The closer the avatar is to a source of the sound (e.g., a store) the louder the sound becomes.

Further aspects of the present disclosure provide for accommodating interaction between multiple users of a VR system in a joint VR environment using the techniques disclosed herein. FIG. 3 illustrates an example scenario accommodating multiple users according to the present disclosure. In FIG. 3, first user 310 and second user 340 are simultaneously engaged in a "joint" VR experience 301. In particular, a joint VR experience may be one in which multiple users may be immersed in respective VR environments sharing at least some of the same parameters, e.g., imagery, audio, context, etc., and further in which the users may be provided some opportunity to interact with each other visually and/or audibly. These audio interactions may be considered internal audio content when evaluated by the technology described herein.

For example, in VR street 302, both users 310, 340 may be immersed and virtually present in joint VR street 302 through receipt of respective output signals, e.g., generated by HMDs 330, 350, audio speakers (not shown), etc. In an embodiment, the VR system may be configured to enable users 310, 340 to interact with each other and with the virtual environment. The users 310 and 340 may be co-located in the same real space or located in different areas of the real world (e.g., different cities, different countries).

A virtual avatar (not shown) representing one of the users may be generated and projected by the VR system into VR environment 301, and other user(s) may view and interact with such avatar, as in real life. For example, first user 310 may speak to second user 340 by facing the avatar (not shown) corresponding to second user 340 in VR environment 301, and by speaking directly into a microphone or another audio input device. First user 310 and second user 340 may also jointly interact with other objects present in VR environment 301. For example, first user 310 may approach a driver's side of a virtual car and open the door, while second user 340 may simultaneously approach a passenger's side of the virtual car and open the door. In this instance, the VR system may interpret the users' inputs as indicating that both users desire to take part in the same joint driving simulation, such as student and teacher in a driving instruction simulation. The VR system may thus arrange for joint street environment 302 to transition to joint driving VR environment (not shown), in which two (or more) users may participate. Moving from the street environment 302 to the car interior may change the applicable sound priorities. For example, sounds originating within the virtual car (e.g., virtual radio, voices, simulated road noise, and simulated engine noise) may be given higher priority characteristics than sounds originating on the street (e.g., voices of other users, sounds emanating from street venues).

Figure 4:
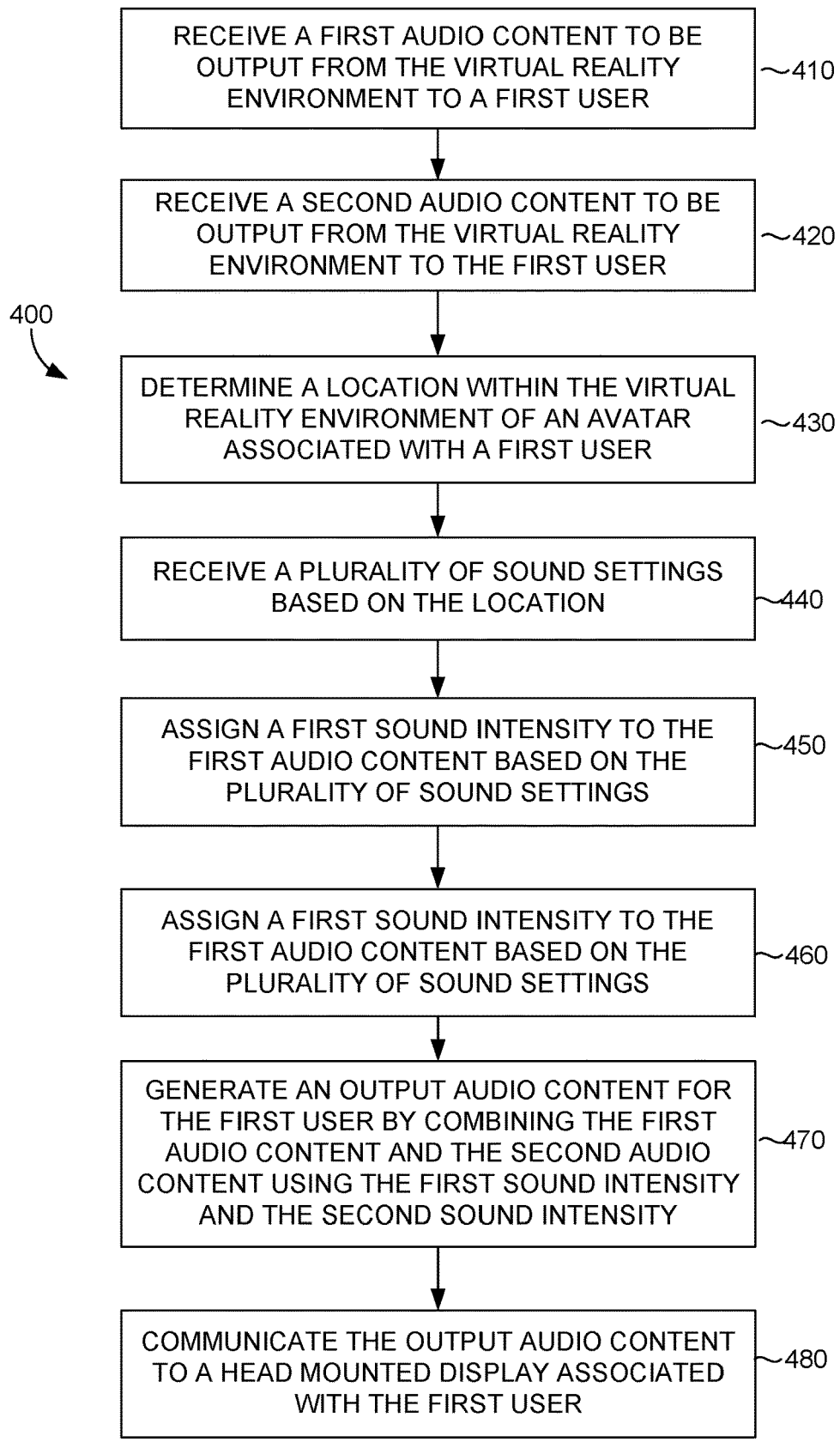
FIG. 4 is a flow chart depicting an example process for merging outside communications with a virtual environment, in accordance with some embodiments of the present disclosure.

Referring to FIG. 4, a flow diagram is provided depicting a method 400 for managing audio output from a virtual environment. Each block of method 400 and other methods described herein comprises a computing process that may be performed using any combination of hardware, firmware, and/or software. For instance, various functions may be carried out by a module, hardware device, or processor executing instructions stored in memory. Various portions of the methods may also be embodied as computer-usable instructions stored on computer storage media. The method 400 may be performed by components described previously with reference to FIGS. 1-3.

At step 410, the method 400 includes receiving a first audio content to be output from the virtual reality environment to a first user. At step 420, the method 400 includes receiving a second audio content to be output from the virtual reality environment to the first user. At step 430, the method 400 includes determining a location within the virtual reality environment of an avatar associated with a first user. At step 440, the method 400 includes receiving a plurality of sound settings based on the location. At step 450, the method 400 includes assigning a first sound intensity to the first audio content based on the plurality of sound settings. At step 460, the method 400 includes assigning a second sound intensity to the second audio content based on the plurality of sound settings. At step 470, the method 400 includes generating an output audio content for the first user by combining the first audio content and the second audio content using the first sound intensity and the second sound intensity. At step 480, the method 400 includes communicating the output audio content to a head mounted display associated with the first user.

Figure 5:
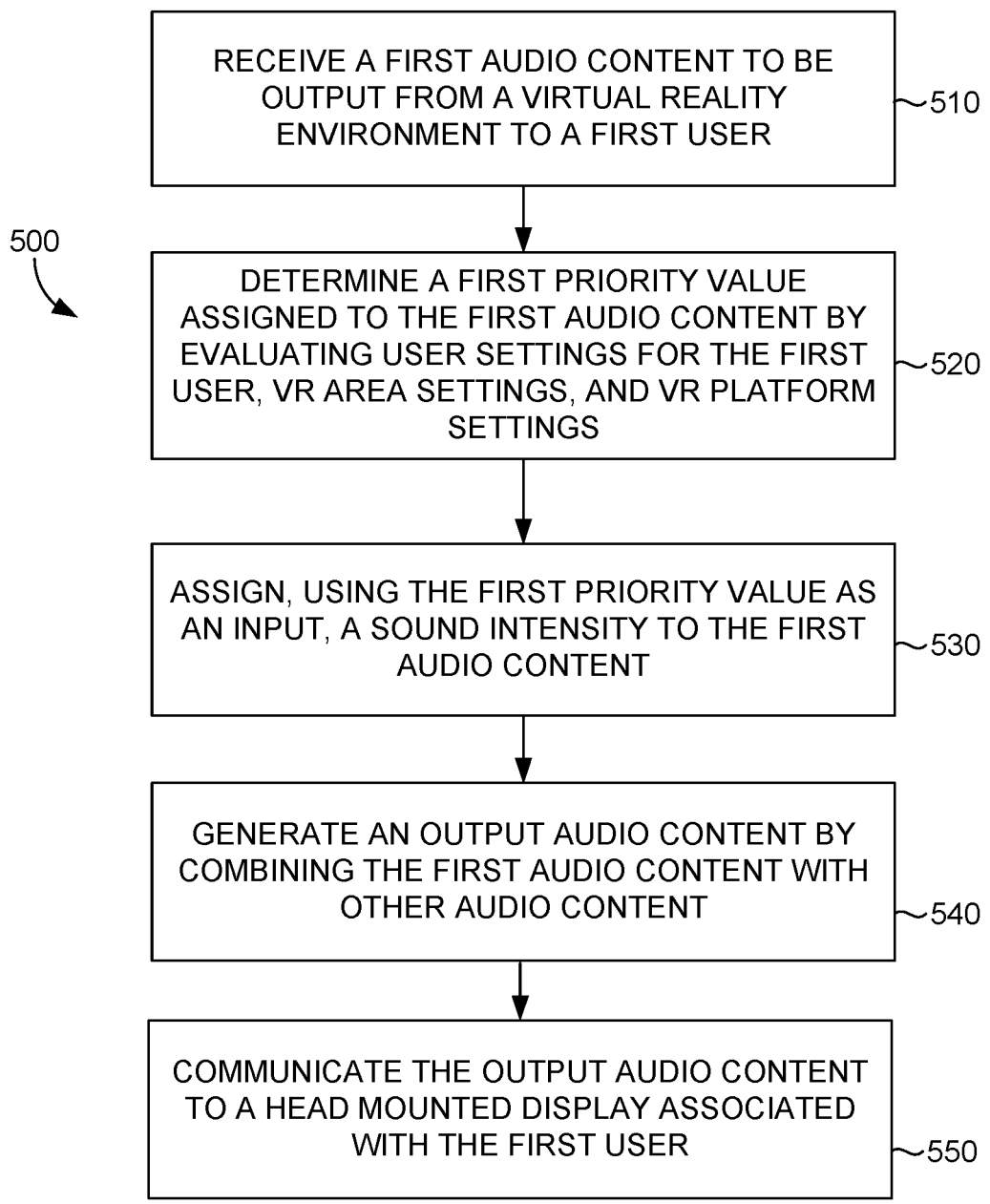
FIG. 5 is a flow chart depicting an example process for merging outside communications with a virtual environment, in accordance with some embodiments of the present disclosure.

Referring now to FIG. 5, a flow diagram is provided depicting a method 500 for merging outside communications with a virtual environment. Each block of method 500 and other methods described herein comprises a computing process that may be performed using any combination of hardware, firmware, and/or software. For instance, various functions may be carried out by a module, hardware device, or processor executing instructions stored in memory. Various portions of the methods may also be embodied as computer-usable instructions stored on computer storage media. The method 500 may be performed by components described previously with reference to FIGS. 1-3.

At step 510, the method 500 includes receiving a first audio content to be output from a virtual reality environment to a first user. At step 520, the method 500 includes determining a first priority value assigned to the first audio content by evaluating user settings for the first user, VR area settings, and VR platform settings. At step 530, the method 500 includes assigning, using the first priority value as an input, a sound intensity to the first audio content. At step 540, the method 500 includes generating an output audio content by combining the first audio content with other audio content. At step 550, the method 500 includes communicating the output audio content to a head mounted display associated with the first user.

Figure 6:
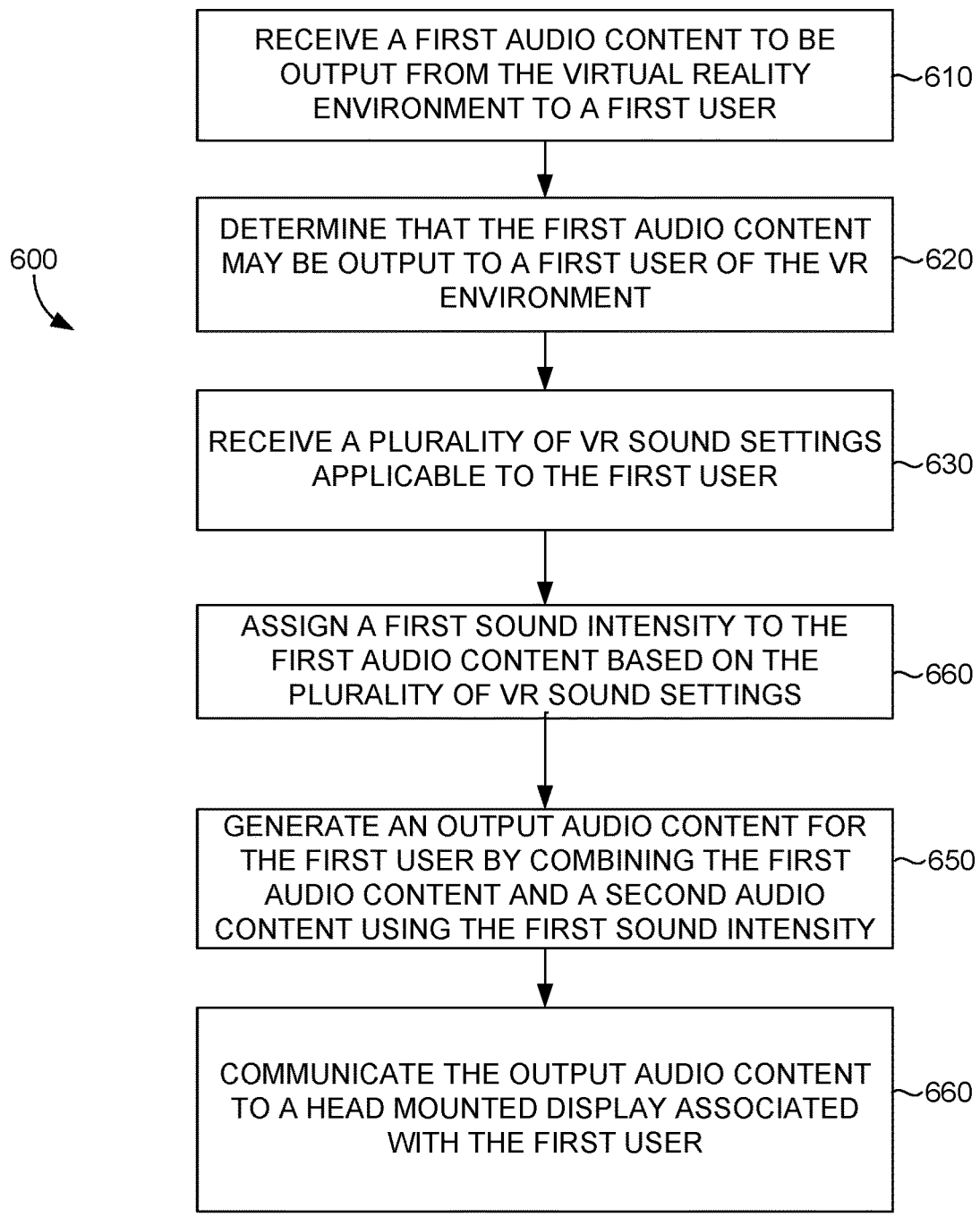
FIG. 6 is a flow chart depicting another example process flow for merging outside communications with a virtual environment, in accordance with some embodiments of the present disclosure.

Referring now to FIG. 6, a flow diagram is provided depicting a method 600 for merging outside communications with a virtual environment. Each block of method 600 and other methods described herein comprises a computing process that may be performed using any combination of hardware, firmware, and/or software. For instance, various functions may be carried out by a module, hardware device, or processor executing instructions stored in memory. Various portions of the methods may also be embodied as computer-usable instructions stored on computer storage media. The method 600 may be performed by components described previously with reference to FIGS. 1-3.

At step 610, the method 600 includes receiving a first audio content to be output from the virtual reality environment to a first user. At step 620, the method 600 includes determining that the first audio content may be output to a first user of the VR environment. At step 630, the method 600 includes receiving a plurality of VR sound settings applicable to the first user. At step 640, the method 600 includes assigning a first sound intensity to the first audio content based on the plurality of VR sound settings. At step 650, the method 600 includes generating an output audio content for the first user by combining the first audio content and a second audio content using the first sound intensity. At step 660, the method 600 includes communicating the output audio content to a head mounted display associated with the first user.

Figure 7:
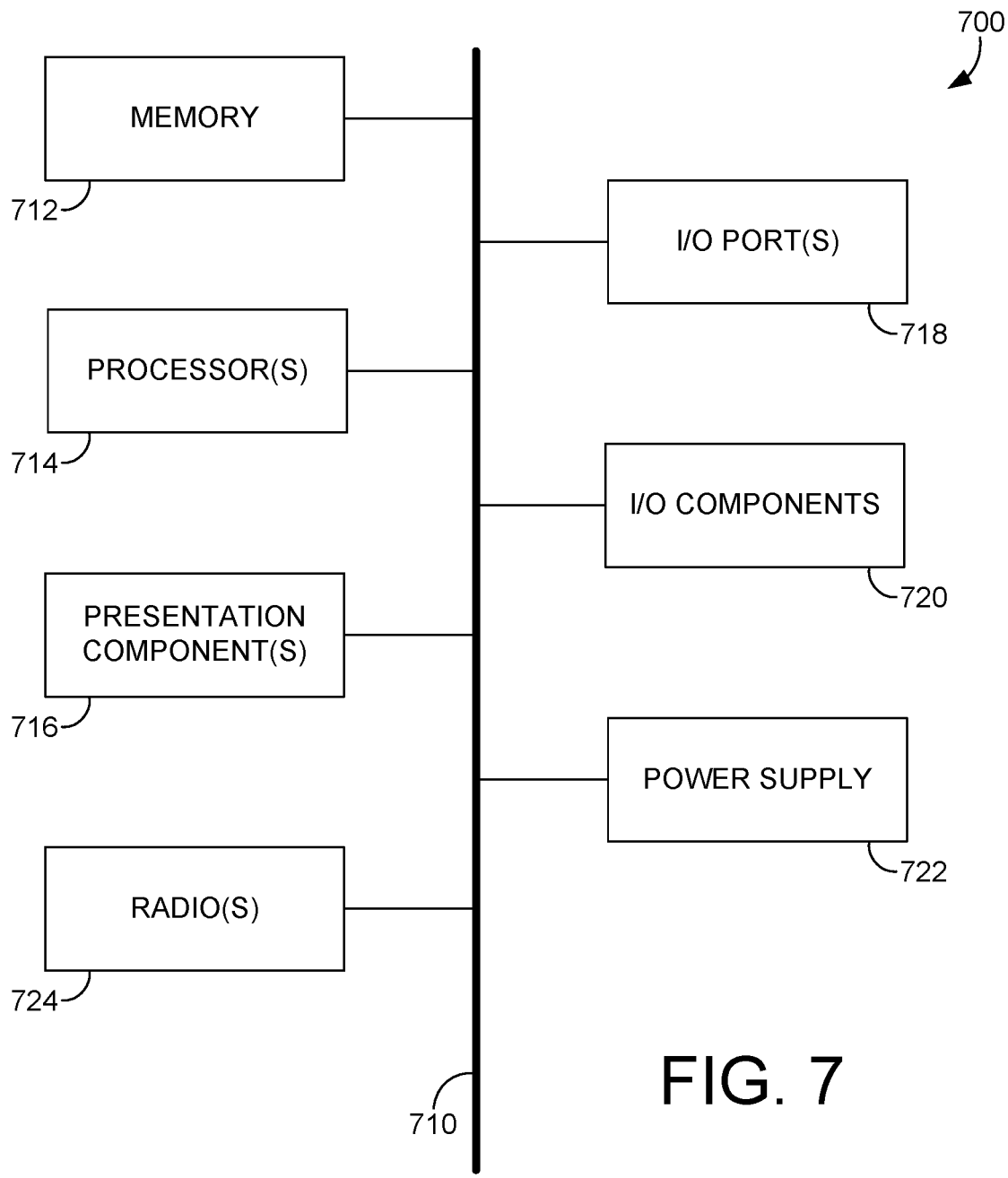
FIG. 7 is a block diagram of an example computing environment suitable for use in accordance with some embodiments of the present disclosure.

With reference now to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Example hardware devices include solid-state memory, hard drives, optical-disc drives, etc. Computing device 700 includes one or more processors that read data from various entities such as memory 712 or I/O components 720. Presentation component(s) 716 present data indications to a user or other device. Example presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of the detailed discussion above, embodiments of the present invention are described with reference to a head-mounted display unit comprising or coupled to a virtualizing computing device; however, the head-mounted display unit depicted herein is merely example. Components can be configured for performing novel aspects of embodiments, where configured for comprises programmed to perform particular tasks or implement particular abstract data types using code. Further, while embodiments of the present invention may generally refer to the head-mounted display unit and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method for managing audio content within a virtual reality environment, the method comprising:
   receiving a first audio content to be output from the virtual reality environment to a first user;
   receiving a second audio content to be output from the virtual reality environment to the first user;
   determining a location within the virtual reality environment of an avatar associated with the first user;
   receiving a plurality of sound settings based on the location;
   assigning a first sound intensity to the first audio content based on the plurality of sound settings;
   assigning a second sound intensity to the second audio content based on the plurality of sound settings;
   generating an output audio content for the first user by combining the first audio content and the second audio content using the first sound intensity and the second sound intensity;
   communicating the output audio content to a head mounted display associated with the first user;
   receiving a request from the first user to record the first audio content through a recording function within the virtual reality environment;
   determining that the first user does not have a recording permission for the first audio content; and
   preventing the first user from recording the first audio content through the recording function within the virtual reality environment.

2. The method of claim 1, wherein the plurality of sound settings are controlled by multiple entities.

3. The method of claim 1, wherein the location is within a virtual area controlled by a third party and a third-party sound setting in the plurality of sound settings is controllable by the third party.

4. The method of claim 3, wherein the first audio content is associated with the third party and the first sound intensity is higher than the second sound intensity based on the third-party sound setting.

5. The method of claim 1, wherein the method further comprises determining that source of the first audio content has rights to communicate the first audio content to the first user.

6. The method of claim 1, further comprising accessing a digital rights database to determine whether an entity has rights to output the first audio content within the virtual reality environment.

7. The method of claim 1, wherein a mixable setting indicates that the first audio content is mixable with the second audio content.

8. A non-transitory computer-storage medium storing computer-useable instructions that, when used by one or more computing devices, cause the one or more computing devices to perform operations comprising:
receiving a first audio content to be output from a virtual reality environment to a first user;
determining a first priority value assigned to the first audio content by evaluating user settings for the first user, virtual reality area settings, and virtual reality platform settings;
assigning, using the first priority value as an input, a sound intensity to the first audio content;
generating an output audio content by combining the first audio content with other audio content; and
communicating the output audio content to a head mounted display associated with the first user.

9. The non-transitory computer-storage medium of claim 8, wherein the operations further comprises determining a virtual reality context for an avatar associated with the first user, wherein the first priority value is dependent on the virtual reality context.

10. The non-transitory computer-storage medium of claim 8, wherein the operations further comprises determining that the first user is authorized to receive the first audio content by querying an audio rights data store.

11. The non-transitory computer-storage medium of claim 8, wherein a preemption setting indicates that the first audio content is preemptable by the other audio content.

12. The non-transitory computer-storage medium of claim 8, wherein a mixable setting indicates that the first audio content is mixable with the other audio content.

13. The non-transitory computer-storage medium of claim 8, wherein a controllable setting indicates that the first user is allowed to control the first audio content.

14. The non-transitory computer-storage medium of claim 13, wherein the control is pause.

15. The non-transitory computer-storage medium of claim 8, wherein the other audio content is communicated into the virtual reality environment from an avatar of a second user co-located in the virtual reality environment with an avatar of the first user.

16. The non-transitory computer-storage medium of claim 8, wherein the operations further comprise accessing a digital rights database to determine whether an entity has rights to output the first audio content within the virtual reality environment.

17. The non-transitory computer-storage medium of claim 8, wherein a mixable setting indicates that the first audio content is mixable with the other audio content.

18. A computer-implemented method for managing audio content within a virtual reality environment, the method comprising:
receiving a first audio content to be output from the virtual reality environment to a first user;
receiving a second audio content to be output from the virtual reality environment to the first user;
determining a location within the virtual reality environment of an avatar associated with the first user;
receiving a plurality of sound settings based on the location;
assigning a first sound intensity to the first audio content based on the plurality of sound settings;
assigning a second sound intensity to the second audio content based on the plurality of sound settings;
generating an output audio content for the first user by combining the first audio content and the second audio content using the first sound intensity and the second sound intensity;
communicating the output audio content to a head mounted display associated with the first user;
receiving a first request from the first user to record the first audio content through a recording function within the virtual reality environment;
determining that the first user has a recording right for the first audio content;
recording the first audio content through the recording function within the virtual reality environment;
receiving a second request from the first user to edit a recorded copy of the first audio content;
determining that the first user does not have an editing right for the first audio content; and
preventing the first user from editing the recorded copy of the first audio content.

19. The method of claim 18, further comprising accessing a digital rights database to determine whether an entity has rights to output the first audio content within the virtual reality environment.

20. A computer-implemented method for managing audio content within a virtual reality environment, the method comprising:
receiving a first audio content to be output from the virtual reality environment to a first user;
receiving a second audio content to be output from the virtual reality environment to the first user;
determining a location within the virtual reality environment of an avatar associated with the first user, wherein the location is within a virtual area controlled by a third party and the first audio content is associated with the third party;
receiving a plurality of sound settings based on the location, wherein a third-party sound setting in the plurality of sound settings is controllable by the third party;
assigning a first sound intensity to the first audio content based on the plurality of sound settings;
assigning a second sound intensity to the second audio content based on the plurality of sound settings;
generating an output audio content for the first user by combining the first audio content and the second audio content using the first sound intensity and the second sound intensity, wherein the first sound intensity is higher than the second sound intensity based on the third-party sound setting;
communicating the output audio content to a head mounted display associated with the first user.

* * * * *